(12) United States Patent
Kikkawa et al.

(10) Patent No.: US 8,625,489 B2
(45) Date of Patent: Jan. 7, 2014

(54) CONTENT OUTPUT APPARATUS, CONTENT PLAYBACK SYSTEM, CONTENT OUTPUT METHOD, AND PROGRAM

(75) Inventors: Norifumi Kikkawa, Tokyo (JP); Hideyuki Suzuki, Tokyo (JP)

(73) Assignee: Sony Corporation (JP)

( * ) Notice: Subject to any disclaimer, the term of this patent is extended or adjusted under 35 U.S.C. 154(b) by 183 days.

(21) Appl. No.: 12/932,348

(22) Filed: Feb. 24, 2011

(65) Prior Publication Data

US 2011/0222474 A1    Sep. 15, 2011

(30) Foreign Application Priority Data

Mar. 15, 2010   (JP) ................. P2010-057855

(51) Int. Cl.
*H04W 24/08* (2009.01)
(52) U.S. Cl.
USPC .................. 370/328; 370/338; 370/310.2
(58) Field of Classification Search
USPC ...................... 370/328, 310.2, 338
See application file for complete search history.

(56) References Cited

U.S. PATENT DOCUMENTS

| 6,307,842 | B1 | 10/2001 | Nakata et al. | |
|---|---|---|---|---|
| 2009/0083856 | A1* | 3/2009 | Aisu et al. | 726/26 |
| 2010/0325239 | A1* | 12/2010 | Khedouri et al. | 709/217 |

FOREIGN PATENT DOCUMENTS

JP    10-164534 A    6/1998

* cited by examiner

*Primary Examiner* — Man Phan
*Assistant Examiner* — Pamit Kaur
(74) *Attorney, Agent, or Firm* — Lerner, David, Littenberg, Krumholz & Mentlik, LLP

(57) ABSTRACT

There is provided a content output apparatus including a wireless communication unit for transmitting an acquisition request for content data based on a position of the content data in an output order, a communication control unit for investigating whether or not acquisition of the content data is possible, before transmitting the acquisition request, and an output control unit for rearranging the output order according to a result of the investigation.

11 Claims, 10 Drawing Sheets

FIG.3

| OUTPUT ORDER | OUTPUT DATA | CONTENT HOLDING APPARATUS |
|---|---|---|
| 0 | CONTENT A | CONTENT TRANSMISSION APPARATUS 10-1 |
| 1 | PLAYLIST B | CONTENT TRANSMISSION APPARATUS 10-2 |
| 2 | PLAYLIST E | CONTENT TRANSMISSION APPARATUS 10-4 |
| 3 | CONTENT C | CONTENT OUTPUT APPARATUS 20 |
| 4 | CONTENT D | CONTENT TRANSMISSION APPARATUS 10-3 |

FIG.4

| OUTPUT ORDER | OUTPUT DATA | CONTENT HOLDING APPARATUS |
|---|---|---|
| 0 | CONTENT A | CONTENT TRANSMISSION APPARATUS 10-1 |
| 1 | PLAYLIST B | CONTENT TRANSMISSION APPARATUS 10-2 |
| 2 | CONTENT C | CONTENT OUTPUT APPARATUS 20 |
| 3 | CONTENT D | CONTROL APPARATUS 10-3 |
| 4 | PLAYLIST E | CONTENT TRANSMISSION APPARATUS 10-4 |

FIG.5

| OUTPUT ORDER | OUTPUT DATA | CONTENT HOLDING APPARATUS |
|---|---|---|
| 0 | CONTENT A | CONTENT TRANSMISSION APPARATUS 10-1 |
| 1 | CONTENT C | CONTENT OUTPUT APPARATUS 20 |
| 2 | CONTENT D | CONTENT TRANSMISSION APPARATUS 10-3 |

CONTENT OUTPUT APPARATUS, CONTENT PLAYBACK SYSTEM, CONTENT OUTPUT METHOD, AND PROGRAM

CROSS-REFERENCE TO RELATED APPLICATION

The present application claims priority from Japanese Patent Application No. JP 2010-057855 filed in the Japanese Patent Office on Mar. 15, 2010, the entire content of which is incorporated herein by reference.

BACKGROUND OF THE INVENTION

1. Field of the Invention

The present invention relates to a content output apparatus, a content playback system, a content output method, and a program.

2. Description of the Related Art

In the past, to transmit content such as music or video to another apparatus, a transmission source and a transmission destination of the content were connected by a cable and transmission was performed via the cable. For example, Japan Patent No. 3834897 describes an audio-visual (AV) system that inputs/outputs video signals and audio signals by an interface specified in Institute of Electrical and Electronic Engineers (IEEE) 1394.

SUMMARY OF THE INVENTION

On the other hand, with the development in wireless communication, a content playback system that is capable of transmitting content by using wireless communication is being proposed. However, for example, in a case content playback reservations are made to one content output apparatus by a plurality of content transmission apparatuses having content pieces, a content transmission apparatus having content and the content output apparatus may not be able to communicate at a time the turn to playback the content has come.

In light of the foregoing, it is desirable to provide a content output apparatus, a content playback system, a content output method, and a program which are novel and improved, and which are capable of rearranging the output order in a case it is not possible to output certain content.

According to an embodiment of the present invention, there is provided a content output apparatus which includes a wireless communication unit for transmitting an acquisition request for content data based on a position of the content data in an output order, a communication control unit for investigating whether or not acquisition of the content data is possible, before transmitting the acquisition request, and an output control unit for rearranging the output order according to a result of the investigation.

According to such configuration, whether acquisition of content data is possible or not is investigated before the start of output of the content data. Then, pieces of content data are rearranged based on the result of the investigation. Therefore, if the communication channel to the content data is in an inaccessible state at the time of the investigation, the output order is automatically rearranged without the operation of the user, and thus playback of content being stopped due to the inaccessibility to the content data can be prevented.

The output control unit may rearrange the output order, in a case the result of the investigation indicates that output of the content data is not possible, so as to lower the position of the content data in the output order.

The communication control unit may carry out the investigation based on whether communication with an apparatus having the content data is possible or not.

The communication control unit may carry out the investigation according to the output order, with respect to a plurality of pieces of the content data.

Therein the wireless communication unit may receive an acquisition request for an output list for managing the output order. The output control unit may cause the communication control unit to transmit the output list, in response to the acquisition request for the output list.

According to another embodiment of the present invention, there is provided a content playback system which includes a content output apparatus including a wireless communication unit for transmitting an acquisition request for content data based on a position of the content data in an output order, a communication control unit for investigating whether or not acquisition of the content data is possible, before transmitting the acquisition request, and an output control unit for rearranging the output order according to a result of the investigation, and a content transmission apparatus having the content data and transmitting the content data in response to the acquisition request.

According to another embodiment of the present invention, there is provided a content output method which includes the steps of transmitting an acquisition request for content data based on a position of the content data in an output order, investigating whether or not acquisition of the content data is possible, before transmitting the acquisition request, and rearranging the output order according to a result of the investigation.

According to another embodiment of the present invention, there is provided a program for causing a computer to function as a content output apparatus including a wireless communication unit for transmitting an acquisition request for content data based on a position of the content data in an output order, a communication control unit for investigating whether or not acquisition of the content data is possible, before transmitting the acquisition request, and an output control unit for rearranging the output order according to a result of the investigation.

According to the embodiments of the present invention described above, it is possible to rearrange the output order in a case it is not possible to output certain content.

BRIEF DESCRIPTION OF THE DRAWINGS

FIG. 3 is an explanatory diagram showing an example of the output list after a reservation is accepted;

FIG. 4 is an explanatory diagram showing an example of the output list after a reservation is accepted;

FIG. 5 is an explanatory diagram showing an example of the output list after a deletion operation;

DETAILED DESCRIPTION OF THE EMBODIMENT

Figure 1:
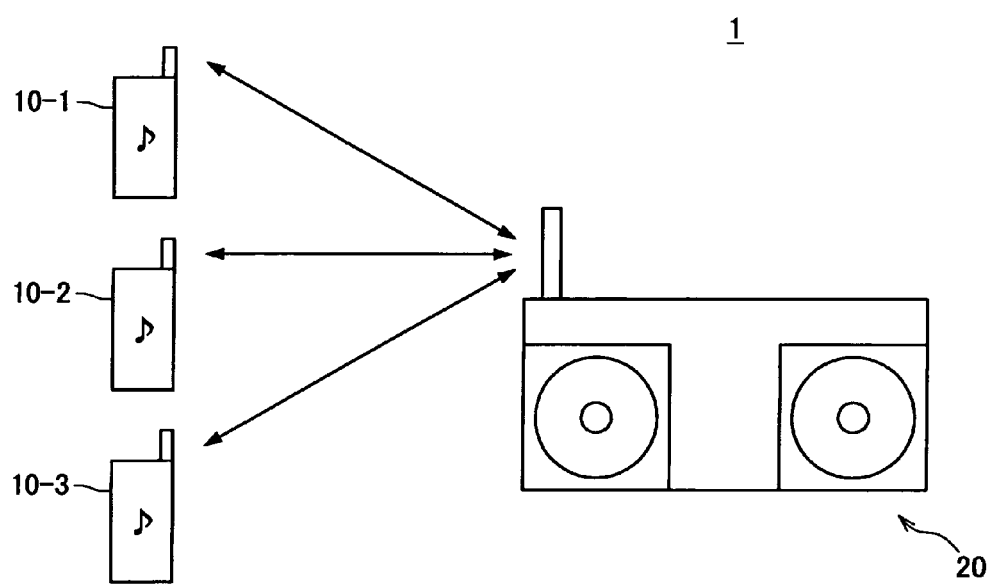
FIG. 1 is an explanatory diagram showing a configuration of a content playback system according to an embodiment of the present invention.

Hereinafter, preferred embodiments of the present invention will be described in detail with reference to the appended drawings. Note that, in this specification and the appended drawings, structural elements that have substantially the same function and structure are denoted with the same reference numerals, and repeated explanation of these structural elements is omitted.

Also, in this specification and the drawings, a plurality of structural elements having substantially the same functional configuration may be distinguished from each other by each having a different number added, after a hyphen, to the same reference numeral. For example, a plurality of elements having substantially the same functional configuration are distinguished from each other as necessary, such as a content transmission apparatus 10-1 and a content transmission apparatus 10-2. However, if it is not particularly necessary to distinguish each of a plurality of structural elements having substantially the same functional configuration, only the same reference numeral is assigned. For example, if it is not particularly necessary to distinguish between the content transmission apparatus 10-1 and the content transmission apparatus 10-2, they are simply referred to as the content transmission apparatuses 10.

Additionally, description will be made in the order below.
1. Overview of System
1-1. System Configuration
1-2. Extension of Edit Function for Output List
2. Configuration of Content Transmission Apparatus
3. Configuration of Content Output Apparatus
4. Operation of Content Output Apparatus
4-1. Operation at the Time of Control Message Reception
4-2. Operation before Content Output
5. Example of Effect <1. Overview of System>
(1-1. System Configuration)

First, a schematic configuration of a content playback system according to an embodiment of the present invention will be described with reference to FIG. 1. FIG. 1 is an explanatory diagram showing a configuration of a content playback system according to an embodiment of the present invention.

A content playback system 1 according to the present embodiment includes a content transmission apparatus 10-1, a content transmission apparatus 10-2, a content transmission apparatus 10-3, and a content output apparatus 20.

The content transmission apparatus 10-1, the content transmission apparatus 10-2, the content transmission apparatus 10-3, and the content output apparatus 20 are wireless communication apparatuses capable of connecting to each other according to Wi-Fi Direct specification. A wireless communication apparatus acting as a Group Owner in Wi-Fi Direct functions as the content output apparatus 20, and a wireless communication apparatus acting as a Client functions as the content transmission apparatus 10.

For example, as shown in FIG. 1, with a mobile phone with a small speaker and a music playback apparatus with a large speaker, both having a music playback function, it is desirable that the music playback apparatus with a large speaker functions as the content output apparatus 20 and the mobile phone with a small speaker functions as the content transmission apparatus 10.

The content transmission apparatus 10 has music content data, and transmits the content data to the content output apparatus 20 via wireless connection in response to an acquisition request for the content data from the content output apparatus 20. That is, the content transmission apparatus 10 has a function of a Digital Media Server (DMS), and functions as a so-called Digital Living Network Alliance (DLNA) server. The content transmission apparatus 10 also has a function of a Digital Media Controller (DMC) for controlling the content output apparatus 20 functioning as a Digital Media Renderer (DMR).

The content output apparatus 20 has an output unit, such as a speaker, and accepts a music playback reservation from the content transmission apparatus 10. Also, the content output apparatus 20 manages the output order of pieces of music content data for which playback reservations have been made. The content output apparatus 20 transmits, to the content transmission apparatus 10 that has music content data whose turn to be played back has come, an acquisition request for the content data. Then, the content output apparatus 20 outputs, from a speaker, the content data that the content transmission apparatus 10 has transmitted in response to the acquisition request.

The content output apparatus 20 is a playback apparatus that has a function of the DMR. That is, the content output apparatus 20 functions as a so-called DLNA client. The content output apparatus 20 functioning as the DMR has been know to have a function as follows. First, the content output apparatus 20 has a function of receiving, over a network, an instruction such as playback or cancellation of content data from the content transmission apparatus 10 functioning as the DMC, and of controlling a playback function of itself. Furthermore, the content data to be played back by the content output apparatus 20 at this point may be content data stored within itself, or may be content data stored in an apparatus different from the content output apparatus 20 (for example, the content transmission apparatus 10 that functions as the DMS). The content output apparatus 20 can acquire content data at a location specified by a Uniform Resource Locator (URL) via a network and playback the same.

Also, regarding playback of content data, the content output apparatus 20 can accept a reservation for content data to be played back after the content data that is currently being played back. At this point, the content data for which a reservation is made may be one piece of content data or may be a playlist including pieces of content data. When playback of the content data that is currently being played back is finished, the content output apparatus 20 automatically starts playback of content data for which a reservation has been made such that the content data will be played back next.

As described, the existing content output apparatus 20 can make a playback reservation for a plurality of content pieces by specifying, as content to be played back next, a playlist including the plurality of content pieces. However, it is not possible to accept a further playback reservation for content or a playlist to be played back after the next content or the next playlist. Also, if a playback reservation for a plurality of content pieces is to be made by specifying a playlist, the plurality of content pieces have to be specified "at the same time."

Therefore, with respect to the existing content output apparatus 20, there is an issue that reservations for "a plurality of" content pieces are not "asynchronously" accepted from a plurality of content transmission apparatuses 10 functioning as control apparatuses. Also, once specified, it is not possible to edit a playback reservation for the content data. Furthermore, in a case the communication channel between the content output apparatus 20 and the content transmission apparatus 10 is wireless, the communication channel to the content transmission apparatus 10 having content data may not be able to be used at the timing of starting playback of the content data. Therefore, there is an issue that content data may not be able to be acquired at the timing of playback start.

Accordingly, in view of the above issues, the present embodiment extends a playlist playback specification of the DMR, and enables to edit a playlist for which a playback reservation has already been made. Also, the content output apparatus 20 according to the present embodiment carries out an investigation, before start of playback, on whether content data of content to be played back next is accessible. Then, when the result of the investigation indicates that the content data to be played back next is inaccessible, the content output apparatus 20 uses the function of editing a playlist mentioned above and changes the position, in the playback order, of the content data which is inaccessible.

(1-2. Extension of Edit Function for Output List)

Here, extension of the playlist playback specification of the DMR will be described with reference to a concrete example as follows. According to the present embodiment, to enable editing of an output list, a state variable for managing an output list including a plurality of content pieces and/or content groups is added to the DMR, and an action that uses the added state variable is further added.

In the past, only either of values "current" and "next" could be held in a list of queued content pieces. Accordingly, first, the output list is extended so as to be able to hold values of a plurality of content pieces and/or content groups. For example, an extended output list is written in Extensible Markup Language (XML) as follows.

```
<AVTMediaList>
<AVTMedia index="0">
<AVTransportURI>value of
AVTransportURI</AVTransportURI>
<EmbeddedMetadata>value of
EmbeddedMetadata</EmbeddedMetadata>
</AVTMedia>
<AVTMedia index="1">
<AVTransportURI>value of
AVTransportURI</AVTransportURI>
<EmbeddedMetadata>value of
EmbeddedMetadata</EmbeddedMetadata>
</AVTMedia>
<AVTMedia index="2">
<AVTransportURI>value of
AVTransportURI</AVTransportURI>
<EmbeddedMetadata>value of
EmbeddedMetadata</EmbeddedMetadata>
</AVTMedia>
</AVTMediaList>
```

The output list above holds three content pieces and/or content groups whose index values are respectively 0, 1, and 2. However, an output list extended in the present embodiment is not limited to the above, and may hold n content pieces and/or content groups.

As the value of AVTransportURI above, access information used for accessing content for which a reservation has been made is written. Also, as the value of EmbeddedMetadata, metadata relating to content for which a reservation has been made, such as the name of the content for which a reservation has been made, the playback time, or associated image information, is written.

Additionally, with a case of controlling a plurality of playback streams simultaneously by one DMR in mind, it is specified in the present embodiment that an AVT instance is given to each playback stream and reservation or playback of content is performed by specifying the AVT instance.

In the foregoing, the state variable to be added according to the present embodiment has been described. Next, an action using this state variable will be described using FIGS. 2 to 6.

Actions to be added according to the present embodiment are "action of acquiring output list," "action of adding or deleting content or content group to or from output list," and "action of rearranging content pieces in output list."

Here, the output lists of FIGS. 2 to 6 will be used for explanation. FIGS. 2 to 6 are explanatory diagrams conceptually showing output lists of the present embodiment.

Figure 2:
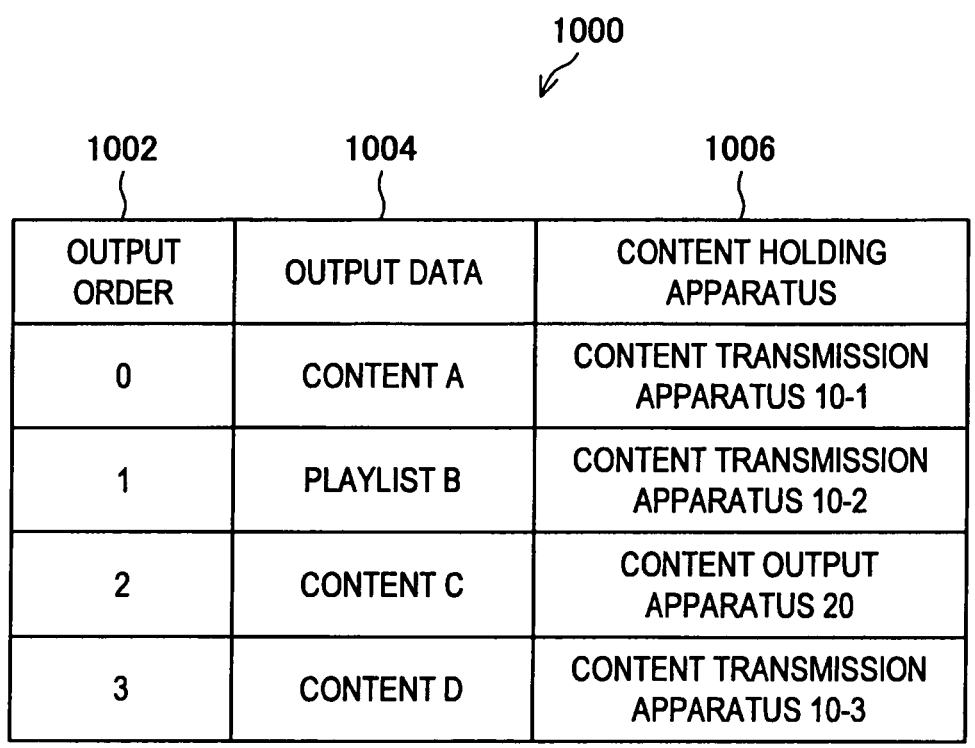
FIG. 2 is an explanatory diagram showing an example of an output list.
Figure 6:
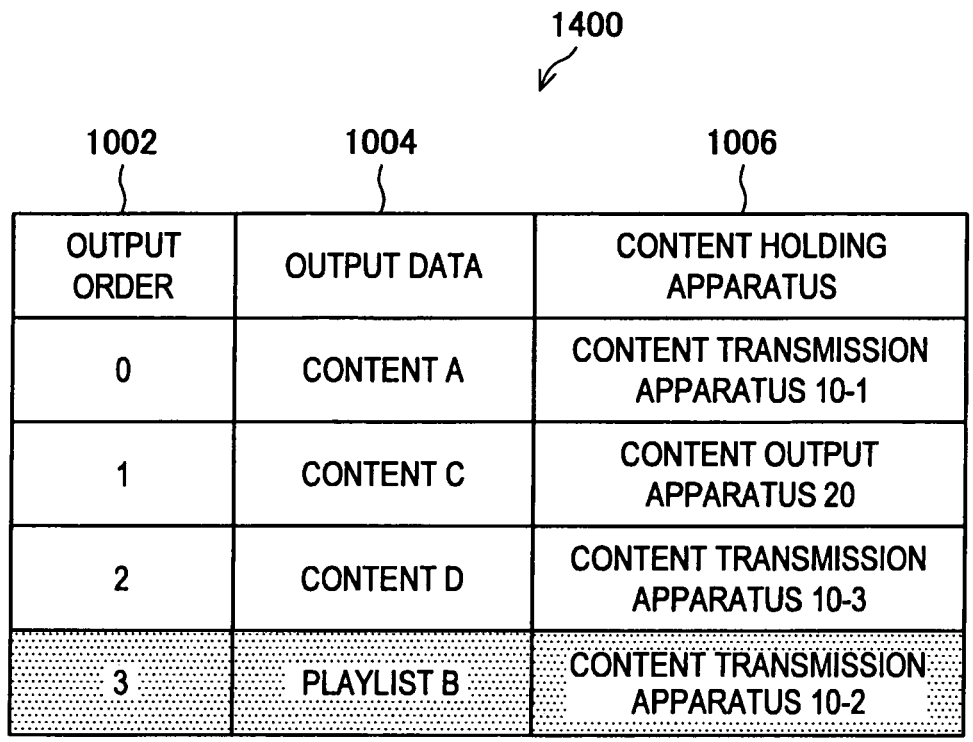
FIG. 6 is an explanatory diagram showing an example of the output list after rearrangement of an output order.

First, an output list 1000 in FIG. 2 holds information such as an output order 1002, output data 1004, and a content holding apparatus 1006. The output order 1002 corresponds to the index in the above output list written in XML, and when the value of the output order is 0, it indicates that the content is currently being played back. Also, the output data 1004 is an example of EmbeddedMetadata in the output list written in XML, and is the name of content data to be output. Furthermore, the content holding apparatus 1006 corresponds to AVTransportURI in the output list written in XML, and information indicating the location of content, such as a URI, is actually stored therein.

First, an explanation will be given on the "action of acquiring output list." The content output apparatus 20 according to the present embodiment accepts, from a content transmission apparatus functioning as a control apparatus, an acquisition request for an output list. For example, the action of acquiring output list is expressed as follows.

GetAVTMediaList (IN AVTInstanceID, OUT AVTMediaList)

Specifically, in the above example, the content output apparatus 20 that processes the action of acquiring output list outputs, based on a specified AVT instance ID, an AVTMediaList (corresponding to the output list) corresponding to the specified instance ID. Information output at this point as the output list includes the above-mentioned AVTransportURI and EmbeddedMetadata.

For example, the content transmission apparatus 10 can acquire the output list 1000 shown in FIG. 2 by requesting the content output apparatus 20 for output of the output list. Here, the output data may include not only the name of content data, but also other metadata, such as a related image or artist name.

Next, an explanation will be given on the "action of adding or deleting content or content group to or from output list." The content output apparatus 20 according to the present embodiment accepts, from the content transmission apparatus 10 functioning as a control apparatus, a request for adding or deleting content or a content group to or from an output list. For example, the action of adding or deleting content or content group to or from output list is expressed as follows.

AddAVTransportURI (IN AVTInstanceID, IN index, IN AVTransportURI, IN EmbeddedMetadata)

In the above example, the content output apparatus 20 that carries out the action of adding or deleting content or content group to or from output list carries out the action below based on specified AVTInstanceID, index, AVTransportURI, and EmbeddedMetadata. For example, in a case values are specified for all of AVTInstanceID, index, AVTransportURI, and EmbeddedMetadata, the content output apparatus 20 inserts the specified AVTransportURI and EmbeddedMetadata in the specified index in the output list, and increments the index of AVTMedia following the specified index by one. For example, when an addition request for adding playlist E held by the content transmission apparatus 10-4 to index=2 is made to the content output apparatus 20 holding the output list 1000 of FIG. 2, the output list 1000 is edited, and an output list 1100 shown in FIG. 3 is generated. Specifically, playlist E is inserted at the second position in the output order of the output list. Then, the index is incremented by one for each of content C and content D whose positions in the output order were respectively second and third in the state shown in FIG. 2.

Furthermore, if, at this point, a special value such as −1 is specified in the index, the specified AVTransportURI and EmbeddedMetadata are added at the end of the output list. According to this configuration, even if the control apparatus does not know how many content pieces are held in the output list at a current point, the control apparatus can add content at the end of the output list. For example, when an addition request for adding playlist E held by the content transmission apparatus 10-4 to index=−1 is made, the output list 1000 is edited, and an output list 1200 shown in FIG. 4 is generated. That is, playlist E is added at the end of the output list 1000.

Furthermore, for example, if the values of AVTransportURI and EmbeddedMetadata are null, it may mean deletion of content specified by the index. In this case, the content output apparatus 20 deletes AVTransportURI and EmbeddedMetadata held at a specified index, and decrements the index of AVTMedia designated by the index following the specified index by one. For example, if a deletion request is made for index=1, content B at index=1 in the output list 1000 is deleted, and an output list 1300 shown in FIG. 5 is generated.

Next, an explanation will be given on the "action of rearranging content pieces in output list." The content output apparatus 20 according to the present embodiment accepts a request for rearranging content pieces in an output list from the content transmission apparatus 10 functioning as a control apparatus, or the like. For example, the action of rearranging content pieces in output list is expressed as follows.

UpdateMediaListPosition (IN oldindex, IN newindex)

In the above example, the content output apparatus 20 that carries out the action of rearranging content pieces in output list moves the content specified by oldindex according to newindex. Specifically, in the case of oldindex<newindex, content specified by oldindex is inserted in the position specified by newindex, and the index of the content that is in between is decremented by one. For example, a request for rearranging oldindex=1 and newindex=3 is made to the content output apparatus 20 holding the output list 1000 of FIG. 2. Then, an output list 1400 in which the position, in the output order, of playlist B for which oldindex is 1 is changed to third and the indices of content C and content D for which the indices are respectively 2 and 3 in the output list 1000 are decremented by one is generated.

In the foregoing, an explanation has been given on the overview of the content playback system 1 according to the present embodiment. The content output apparatus 20 according to the present embodiment is enabled, by the extension of the output list described above, to asynchronously accept content playback reservations from a plurality of content transmission apparatuses 10 functioning as control apparatuses. Also, rearrangement of pieces of content data for which playback reservations have been made is also made possible by the above-described extension.

Accordingly, the content playback system 1 according to the present embodiment smoothly plays back content pieces while investigating the state of wireless communication, by using the extended function. Configurations of the content transmission apparatus 10 and the content output apparatus 20 for realizing such content playback system 1 will be described below.

<2. Configuration of Content Transmission Apparatus>

Figure 7:
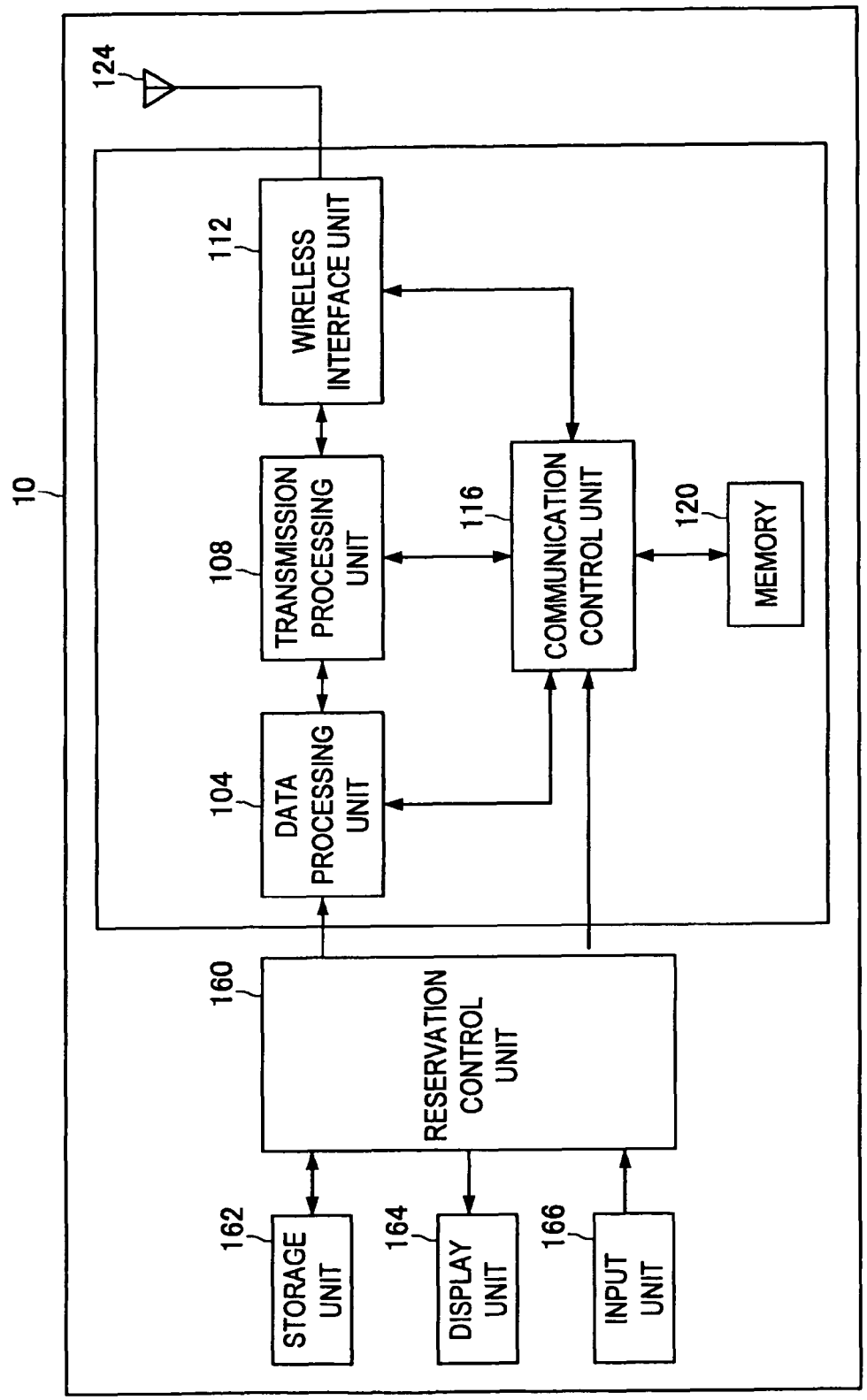
FIG. 7 is a block diagram showing a configuration of a content transmission apparatus according to the embodiment.

FIG. 7 is a block diagram showing a configuration of the content transmission apparatus 10. The content transmission apparatus 10 according to the present embodiment mainly includes a data processing unit 104, a transmission processing unit 108, a wireless interface unit 112, a communication control unit 116, a memory 120, an antenna 124, a reservation control unit 160, a storage unit 162, a display unit 164, and an input unit 166.

Among the above, the data processing unit 104, the transmission processing unit 108, the wireless interface unit 112, and the antenna 124 will function as a wireless communication unit when the communication control unit 116 controls their operations.

At the time of receiving a wireless signal, the wireless interface unit 112 decodes various data frames by down-converting a wireless signal received by the antenna 124 and converting the same to a bit string. When it is checked that there is no error in the various data frames supplied by the wireless interface unit 112, the transmission processing unit 108 supplies the various data frames to the data processing unit 104. The data processing unit 104 processes and analyses the various data frames and data packets supplied from the transmission processing unit 108.

Also, at the time of transmitting a wireless signal, the data processing unit 104 generates various data frames or data packets according to a request from the content output apparatus 20 or the like, for example, and supplies the same to the transmission processing unit 108. The transmission processing unit 108 performs processing such as addition of various data headers and error detection codes such as a frame check sequence (FCS) on the packets generated by the data processing unit 104, and supplies the data after processing to the wireless interface unit 112. The wireless interface unit 112 generates, from the data received from the transmission processing unit 108, a modulation signal in the frequency range of a carrier wave, and causes the antenna 124 to transmit the same as a wireless signal.

The communication control unit 116 controls the operations of the data processing unit 104, the transmission processing unit 108, the wireless interface unit 112, and the antenna 124, and causes them to function as a reception unit or a transmission unit. For example, in response to an instruction from the reservation control unit 160, the communication control unit 116 controls the operations of the data processing unit 104, the transmission processing unit 108, the wireless interface unit 112, and the antenna 124, and causes them to function as a transmission unit for transmitting a playback reservation message. Or, depending on the situation (for example, in a case there is no communication for a specific time or longer), the communication control unit 116 controls the operations of the data processing unit 104, the transmission processing unit 108, the wireless interface unit 112, and the antenna 124, and changes an operation mode so that they will operate in a power-saving mode. Furthermore, in response to a connection request from the content output apparatus 20, for example, the communication control unit 116 controls the operations of the data processing unit 104, the transmission processing unit 108, the wireless interface unit 112, and the antenna 124, and causes the operation mode to transition from the power-saving mode to a normal mode.

The memory 120 undertakes a role of a work area for data processing by the communication control unit 116, or has a function of a storage medium for holding various types of data. The memory 120 may be a storage medium such as a non-volatile memory, a magnetic disk, an optical disk, or a magneto-optical (MO) disk. The non-volatile memory may be, for example, a flash memory, an electrically erasable programmable read-only memory (EEPROM), or an erasable programmable read-only memory (EPROM). Also, the magnetic disk may be a hard disk, a discoid magnetic disk, or the like. Furthermore, the optical disk may be a compact disc (CD), a digital versatile disc recordable (DVD-R), a Blu-ray disc (BD; registered trademark), or the like.

The reservation control unit 160 makes a playback reservation for content to the content output apparatus 20 based on operation information from the input unit 166. Specifically, the reservation control unit 160 makes the display unit 164 display a playback reservation screen, generates a playback reservation message by acquiring a playback reservation operation of a user via the input unit 166, and instructs the communication control unit 116 to transmit the generated playback reservation message to the content output apparatus 20. Also, when a transmission instruction is received from the content output apparatus 20, the reservation control unit 160 acquires content data from the storage unit 162, and instructs the communication control unit 116 to transmit the same to the content output apparatus 20, in response to the transmission instruction.

The storage unit 162 has a function of a storage medium for storing content data, for example. The storage unit 162 may be a storage medium such as a non-volatile memory, a magnetic disk, an optical disk, or a magneto-optical (MO) disk. The non-volatile memory may be, for example, a flash memory, an electrically erasable programmable read-only memory (EEPROM), or an erasable programmable read-only memory (EPROM). Also, the magnetic disk may be a hard disk, a discoid magnetic disk, or the like. Furthermore, the optical disk may be a compact disc (CD), a digital versatile disc recordable (DVD-R), a Blu-ray disc (BD; registered trademark), or the like.

The display unit 164 is an example of an output apparatus for outputting various types of information to a user according to control by the reservation control unit 160. For example, the content transmission apparatus 10 may itself display a list of content data in the storage unit 162, and have a user select content data to be output from the content output apparatus 20. Or, an output list managed by the content output apparatus 20 may be acquired from the content output apparatus 20, and be displayed by the display unit 164.

The input unit 166 is configured from input means for a user to input information, such as a mouse, a keyboard, a touch panel, a button, a microphone, a switch, or a lever, an input control circuit that generates an input signal based on input from the user and outputs the same to a CPU (not shown), and the like. The user of the content transmission apparatus 10 can input various types of data to the content transmission apparatus 10 or instruct processing operations thereto by operating the input means.

Additionally, the functions of the communication control unit 116 and the reservation control unit 160 are achieved, in reality, by an arithmetic apparatus such as a central processing unit (CPU) not shown reading out a control program from a storage medium, such as a read only memory (ROM), a random access memory (RAM), or the like, storing a control program describing processing for realizing these functions, and interpreting and carrying out the program.

<3. Configuration of Content Output Apparatus>

Figure 8:
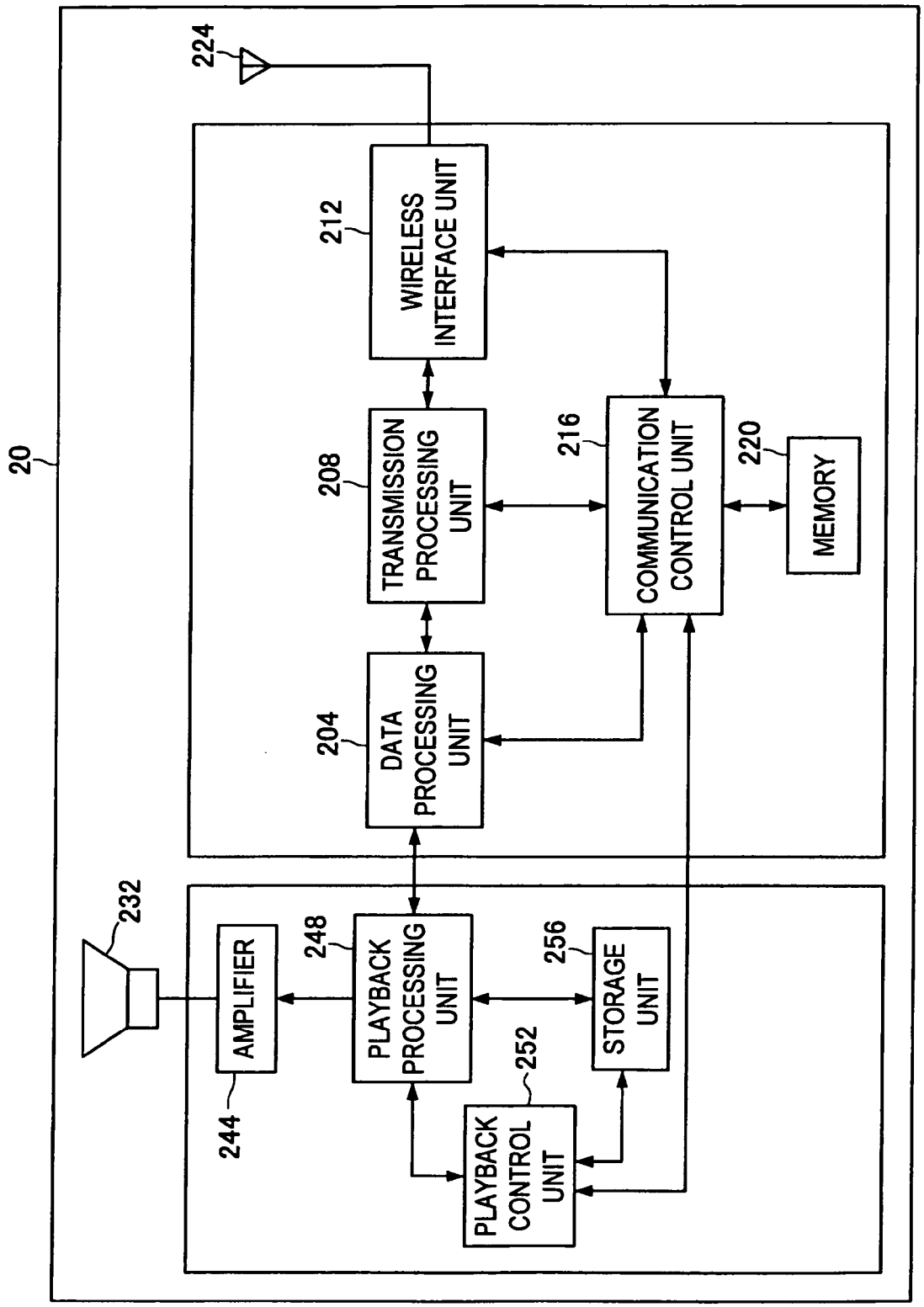
FIG. 8 is a block diagram showing a configuration of a content output apparatus according to the embodiment.

Next, a configuration of the content output apparatus 20 will be described by using FIG. 8. FIG. 8 is a block diagram showing a configuration of the content output apparatus 20. The content output apparatus 20 according to the present embodiment mainly includes a data processing unit 204, a transmission processing unit 208, a wireless interface unit 212, a communication control unit 216, a memory 220, an antenna 224, a speaker 232, an amplifier 244, a playback processing unit 248, a playback control unit 252, and a storage unit 256.

Among the above, the data processing unit 204, the transmission processing unit 208, the wireless interface unit 212, and the antenna 224 will function as a wireless communication unit when the communication control unit 216 controls their operations.

At the time of receiving a wireless signal, the wireless interface unit 212 decodes various data frames by down-converting a wireless signal received by the antenna 224 and converting the same to a bit string. When it is checked that there is no error in the various data frames supplied by the wireless interface unit 212, the transmission processing unit 208 supplies the various data frames to the data processing unit 204. The data processing unit 204 processes and analyses the various data frames and data packets supplied from the transmission processing unit 208.

Also, at the time of transmitting a wireless signal, the data processing unit 204 generates various data frames or data packets according to a request from the playback processing unit 248 or the like, for example, and supplies the same to the transmission processing unit 208. The transmission processing unit 208 performs processing such as addition of various data headers and error detection codes such as a frame check sequence (FCS) on the packets generated by the data processing unit 204, and supplies the data after processing to the wireless interface unit 212. The wireless interface unit 212 generates, from the data received from the transmission processing unit 208, a modulation signal in the frequency range of a carrier wave, and causes the antenna 224 to transmit the same as a wireless signal.

For example, when a playback reservation message or content data is received from the content transmission apparatus 10, the communication control unit 216 transfers the received information to the playback control unit 252. Also, the communication control unit 216 investigates, with respect to the content transmission apparatus 10 having content data whose turn is near in the output list, whether acquisition of content data is possible or not, according to an instruction from the playback control unit 252. Specifically, the communication control unit 216 makes a connection request to the target content transmission apparatus 10, and investigates whether acquisition of the content data is possible or not based on whether connection to the content transmission apparatus 10 is possible or not. The communication control unit 216 inputs the result of the investigation to the playback control unit 252.

Then, in a case the result of the investigation indicates that connection to the content transmission apparatus 10 having content data which is to be played back soon is possible, the playback control unit 252, which has received the result of the investigation, instructs the communication control unit 216 to transmit an acquisition request for the content data to the content transmission apparatus 10. On the other hand, in a case connection to the content transmission apparatus 10 is not possible, the playback control unit 252 rearranges the output order of the plurality of pieces of content data. Specifically, the output order is rearranged such that the position, in the output order, of the content data the acquisition of which has been indicated by the result of the investigation to be not possible is moved to a lower position. The position, in the output order, of content data may be moved such that the position is moved one position lower or is moved to the end of the output list.

In a case the communication channel between the content transmission apparatus 10 and the content output apparatus 20 is wireless, even if it is decided at the time of investigation that acquisition of content data is not possible, acquisition of the content data may sometimes become possible during the course of time. That is, there may be a case where the content transmission apparatus 10 having content data is temporarily disconnected from a wireless network at the time it is decided that acquisition of the content data is not possible, but will join the wireless network again during the course of time.

Furthermore, in a case the content transmission apparatus 10 is operating in a power-saving mode, the content transmission apparatus 10 can transition to a normal mode during the time before playback start of content data by having a connection request made to the content transmission apparatus 10 in advance, and delay of the playback start of the content data can be prevented. That is, the investigation on the acquisition possibility of the content data carried out by the communication control unit 216 is preferably carried out prior to the playback start of the content data by at least a time necessary for the content transmission apparatus 10 to transition from the power-saving mode to the normal mode or longer.

The memory 220 undertakes a role of a work area for data processing by the communication control unit 216, or has a function of a storage medium for holding various types of data. The memory 220 may be a storage medium such as a non-volatile memory, a magnetic disk, an optical disk, or a magneto-optical (MO) disk. The non-volatile memory may be, for example, a flash memory, an electrically erasable programmable read-only memory (EEPROM), or an erasable programmable read-only memory (EPROM). Also, the magnetic disk may be a hard disk, a discoid magnetic disk, or the like. Furthermore, the optical disk may be a compact disc (CD), a digital versatile disc recordable (DVD-R), a Blu-ray disc (BD; registered trademark), or the like.

The speaker 232 is an output apparatus for outputting playback data of content. In the present embodiment, a configuration having a speaker is taken as an example of the output apparatus, but the output apparatus is not limited to such. For example, the output apparatus may be a display, and may be able to output video content.

The amplifier 244 has a function of amplifying a signal input by the playback processing unit 248 and inputting the same to the speaker 232. Also, the playback processing unit 248 performs decoding processing or the like on content data which has been input. The playback control unit 252 has a function of performing control such that the playback processing unit 248 performs playback processing.

The storage unit 256 has a function of a storage medium for storing content data, for example. It may also functions as a storage medium for storing an output list. The storage unit 256 may be a storage medium such as a non-volatile memory, or a magnetic disk. The non-volatile memory may be, for example, a flash memory, an electrically erasable programmable read-only memory (EEPROM), or an erasable programmable read-only memory (EPROM). Also, the magnetic disk may be a hard disk, a discoid magnetic disk, or the like.

<4. Operation of Content Output Apparatus>

Figure 9:
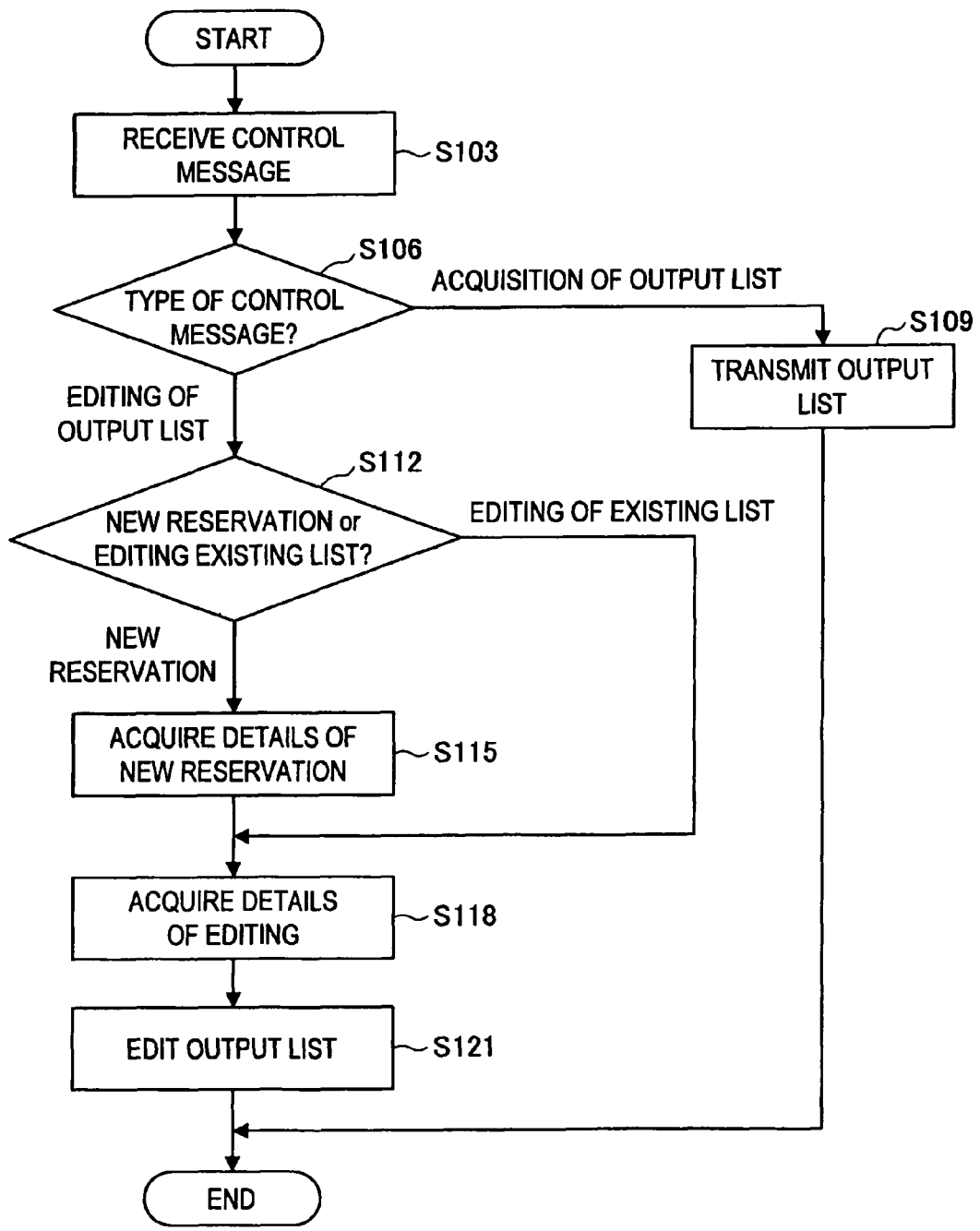
FIG. 9 is a flow chart showing an operation of the content output apparatus according to the embodiment at the time of control message reception.
Figure 10:
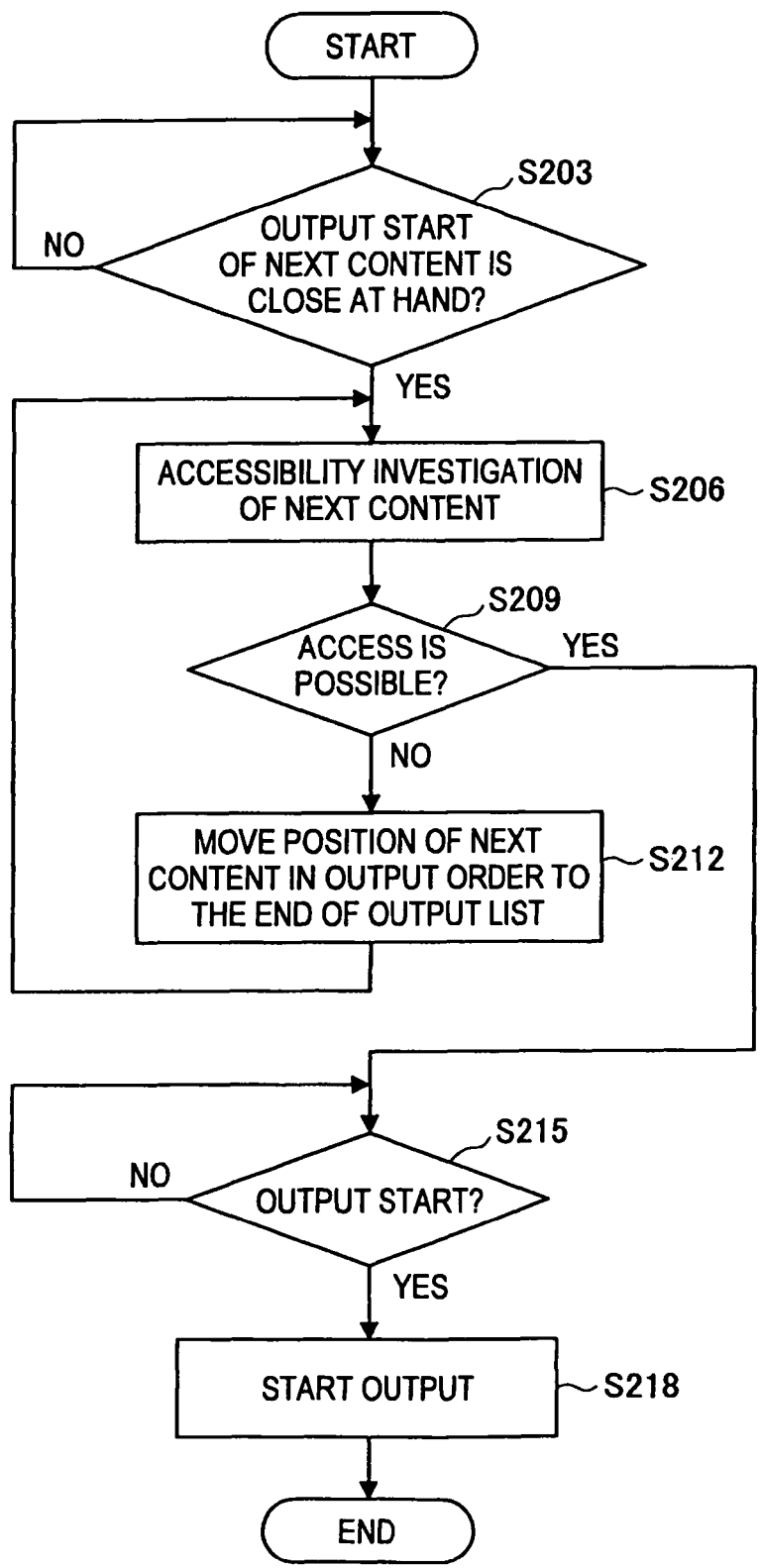
FIG. 10 is a flow chart showing an operation of the content output apparatus according to the embodiment for investigating whether content data can be output or not.

Next, an operation of the content output apparatus 20 will be described by using FIGS. 9 and 10. FIG. 9 is a flow chart showing an operation performed at the time of the content output apparatus 20 receiving a control message from the content transmission apparatus 10 functioning as a control apparatus. Also, FIG. 10 is a flow chart showing an operation performed by the content output apparatus 20 in the time until the start of content data.

(4-1. Operation at the Time of Control Message Reception)

First, an operation performed in a case the content output apparatus 20 received a control message will be described with reference to FIG. 9. Here, the types of control messages to be received are roughly divided into an acquisition request for an output list and an edit request for the output list, and the edit request for the output list may be further divided into a new reservation request and an edit request for an existing list.

First, when a wireless communication unit of the content output apparatus 20 receives a control message from the content transmission apparatus 10 (S103), the playback control unit 252 determines the type of the control message (S106). If the received control message here is an acquisition request message for an output list, the playback control unit 252 transmits an output list to the content transmission apparatus 10 which is the transmission source of the control message, by giving an instruction to the communication control unit 216 (S109).

On the other hand, if it is decided by the decision at step S106 that the type of the control message is an edit request for an output list, the playback control unit 252 further determines whether it is a playback reservation message for a new reservation or an edit request message for an existing list (S112).

Then, if the control message is the playback reservation message for a new reservation, the playback control unit 252 acquires details of the new reservation (information for designating content, position in output order, and the like) from the playback reservation message (S115). On the other hand, if it is decided by the decision at step S112 to be the edit request message for an existing list, the playback control unit 252 acquires the details of editing from the control message (S118). For example, in a case of deleting content data from an output list, information on the position, in the output order, of content data to be deleted and the like correspond to the details of editing. Or, in a case of rearranging the order of content pieces in an output list, the values of the output order before and after the change, for example, correspond to the details of editing.

Then, the playback control unit 252 edits the output list based on the details of the new reservation or the details of editing which have been acquired. The concrete method of editing an output list is as described above.

(4-2. Operation Before Content Output)

Next, an operation to be performed by the content output apparatus 20 in the time until output start of content data will be described with reference to FIG. 10.

First, the playback control unit 252 decides whether the output start of content next in the output order is close at hand or not (S203). If it is decided by the decision at step S203 that the output start of the next content is close at hand, the communication control unit 216 is made to carry out accessibility investigation of the next content data (S206).

The playback control unit 252 decides whether access to the content data is possible or not based on the result of the investigation at step S206 (S209), and in a case access is possible, decides next whether a timing of output start of the content has arrived (S215). Then, when the timing of output start has arrived, the content data is acquired and output of the same is started (S218).

On the other hand, if access to the content data is decided to be not possible based on the decision at step S209, the playback control unit 252 moves the position of the next content in the output order to the end of the output list (S212), returns to step S206, and carries out accessibility investigation of the next content data in the output list whose output order has been rearranged.

<5. Example of Effect>

In the foregoing, the content playback system 1 according to an embodiment of the present invention has been described. The content playback system 1 first extends a list (output list) of queued content pieces which could hold only two values, "Current" and "Next," according to the specification of MediaRenderer of an existing DLNA so as to enable the list to hold a plurality of queued content pieces. At this point, an index indicating a position in the output order is added as a state variable.

Furthermore, the present embodiment enables to edit the output order of the output list by specifying the index. Actions that are specifically added are an action of adding or deleting content data to or from the output list and an action of rearranging the output list. Furthermore, an action for acquiring the output list is also added here to enable a control apparatus to perform operation while referring to the state of the output list at the time point.

With the extended functions as described above, the content output apparatus 20 according to the present embodiment is enabled to accept playback reservations from a plurality of control apparatuses at a plurality of timings. Also, editing of the output list by a plurality of control apparatuses is also made possible.

Also, the content output apparatus 20 according to the present embodiment investigates, before acquisition of content data, whether acquisition of the content data is possible or not, and rearranges the output order of the output list according to the result of the investigation. According to such configuration, even if the content output apparatus 20 and the content transmission apparatus 10 are connected via a network with low accessibility, the content data can be played back if only the content output apparatus 20 and the content transmission apparatus 10 are connected via the network at the time of control, such as at the time of making a playback reservation, and at the time of playback. Also, even if the content output apparatus 20 is not able to access the content data immediately before playback start, the position of the content data in the output order is automatically moved, and thus, when the content transmission apparatus 10 having the content data is reconnected to the network, playback of the content data is enabled. Here, since a user does not have to perform interaction control each time, it is highly convenient for the user.

It should be understood by those skilled in the art that various modifications, combinations, sub-combinations and alterations may occur depending on design requirements and other factors insofar as they are within the scope of the appended claims or the equivalents thereof.

For example, according to the embodiment described above, investigation on whether access to content data is possible or not is carried out only on the content data that is next in the output order. However, the present invention is not limited to such an example. For example, the accessibility investigation may be carried out on the next three content pieces, taking into consideration that playback of content data may be skipped by a user operation.

Furthermore, in FIG. 10, a case is described where content data is moved to the end of the output list in a case access to the content data is not possible. However, the present invention is not limited to such an example. The output order may be rearranged such that the position, in the output order, of the content data to which access is not possible is moved one position lower.

Additionally, in the embodiment described above, it is assumed that the content transmission apparatus 10 functions as a control apparatus. However, the present invention is not limited to such an example. For example, content data may be stored in another apparatus not having the control function.

Moreover, in the present specification, the steps described in the flow charts include not only the processing performed chronologically in the described order, but also the processing performed in parallel or individually instead of being performed chronologically. Moreover, needless to say, the order may be changed as appropriate even if the steps are meant to be performed chronologically.

What is claimed is:

1. A content output apparatus comprising:
a wireless communication unit for transmitting an acquisition request for content data based on a position of the content data in an output order of a list;
a communication control unit for investigating whether or not acquisition of the content data is possible, before transmitting the acquisition request; and
an output control unit for rearranging the output order according to a result of the investigation,
in which the investigating by the communication control unit is based on whether or not a connection is possible to the content output apparatus by a content transmission apparatus having the content data which is requested, such that if the result of the investigation indicates that the connection is not possible the output control unit automatically rearranges the output order so as to automatically lower the position of the content data in the output order without a user interaction at a time thereof and without removing the content data from the list.

2. The content output apparatus according to claim 1, wherein the communication control unit carries out the investigation according to the output order, with respect to a plurality of pieces of the content data.

3. The content output apparatus according to claim 1, wherein if the result of the investigation indicates that the connection is not possible the output control unit automatically rearranges the output order so as to automatically lower the position of the content data in the output order by one position without the user interaction at such time.

4. The content output apparatus according to claim 1, wherein if the result of the investigation indicates that the connection is not possible the output control unit automatically rearranges the output order so as to automatically lower the position of the content data in the output order to an end of the list without the user interaction at such time.

5. The content output apparatus according to claim 1, wherein the communication control unit investigates whether or not acquisition of the content data is possible for a plurality of pieces of content data each piece having a respective position in the output order.

6. A content playback system comprising:
a content output apparatus including
a wireless communication unit for transmitting an acquisition request for content data based on a position of the content data in an output order of a list,
a communication control unit for investigating whether or not acquisition of the content data is possible, before transmitting the acquisition request, and
an output control unit for rearranging the output order according to a result of the investigation; and
a content transmission apparatus having the content data and transmitting the content data in response to the acquisition request, in which the investigating by the communication control unit is based on whether or not a connection is possible to the content output apparatus by the content transmission apparatus having the content data which is requested, such that if the result of the investigation indicates that the connection is not possible the output control unit automatically rearranges the output order so as to automatically lower the position of the content data in the output order without a user interaction at a time thereof and without removing the content data from the list.

7. The content playback system according to claim 6, wherein if the result of the investigation indicates that the connection is not possible the output control unit automatically rearranges the output order so as to automatically lower the position of the content data in the output order by one position without the user interaction at such time.

8. The content playback system according to claim 6, wherein if the result of the investigation indicates that the connection is not possible the output control unit automatically rearranges the output order so as to automatically lower the position of the content data in the output order to an end of the list without the user interaction at such time.

9. The content playback system according to claim 6, wherein the communication control unit investigates whether or not acquisition of the content data is possible for a plurality of pieces of content data each piece having a respective position in the output order.

10. A content output method for use by a content output apparatus, said method comprising the steps of:
 transmitting an acquisition request for content data based on a position of the content data in an output order of a list,
 investigating whether or not acquisition of the content data is possible, before transmitting the acquisition request, and
 rearranging the output order according to a result of the investigation,
 in which the investigating step is based on whether or not a connection is possible to the content output apparatus by a content transmission apparatus having the content data which is requested, such that if the result of the investigation indicates that the connection is not possible the rearranging step automatically rearranges the output order so as to automatically lower the position of the content data in the output order without a user interaction at a time thereof and without removing the content data from the list.

11. A program for causing a computer to function as a content output apparatus including
 a wireless communication unit for transmitting an acquisition request for content data based on a position of the content data in an output order of a list,
 a communication control unit for investigating whether or not acquisition of the content data is possible, before transmitting the acquisition request, and
 an output control unit for rearranging the output order according to a result of the investigation,
 in which the investigating by the communication control unit is based on whether or not a connection is possible to the content output apparatus by a content transmission apparatus having the content data which is requested, such that if the result of the investigation indicates that the connection is not possible the output control unit automatically rearranges the output order so as to automatically lower the position of the content data in the output order without a user interaction at a time thereof and without removing the content data from the list.

* * * * *